US011743516B2

(12) United States Patent
Lintz et al.

(10) Patent No.: US 11,743,516 B2
(45) Date of Patent: *Aug. 29, 2023

(54) CONTENT BOUNDARY BASED RECORDINGS

(71) Applicant: Comcast Cable Communications, LLC, Philadelphia, PA (US)

(72) Inventors: Christopher Lintz, Denver, CO (US); Tedd Dawson, Littleton, CO (US); Jason Burgess, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,682

(22) Filed: Jun. 29, 2022

(65) Prior Publication Data

US 2023/0007319 A1   Jan. 5, 2023

Related U.S. Application Data

(63) Continuation of application No. 17/445,894, filed on Aug. 25, 2021, now Pat. No. 11,412,273, which is a continuation of application No. 15/282,038, filed on Sep. 30, 2016, now Pat. No. 11,134,278.

(51) Int. Cl.
*H04N 21/234* (2011.01)
*H04N 21/2747* (2011.01)
*H04N 21/472* (2011.01)
*H04N 21/236* (2011.01)
*H04N 21/61* (2011.01)

(52) U.S. Cl.
CPC . *H04N 21/23418* (2013.01); *H04N 21/23605* (2013.01); *H04N 21/2747* (2013.01); *H04N 21/47214* (2013.01); *H04N 21/6118* (2013.01); *H04N 21/6125* (2013.01); *H04N 21/6143* (2013.01)

(58) Field of Classification Search
CPC ....... H04N 21/23418; H04N 21/23605; H04N 21/2747; H04N 21/47214
See application file for complete search history.

(56) References Cited

U.S. PATENT DOCUMENTS

| 2003/0233657 | A1 | 12/2003 | Takagi et al. |
| 2004/0258390 | A1 | 12/2004 | Olson |
| 2005/0262539 | A1 | 11/2005 | Barton et al. |
| 2007/0010359 | A1 | 1/2007 | Arrington |
| 2012/0114306 | A1 | 5/2012 | Aldrey et al. |

FOREIGN PATENT DOCUMENTS

WO         2004/057864 A2   7/2004

OTHER PUBLICATIONS

Society of Cable Telecommunications Engineers, ANSI/SCTE 35 "Digital Program Insertion Cueing Message for Cable", 2013, pp. 1-45.
US Patent Application filed Aug. 25, 2021, entitled "Content Boundary Based Recordings", U.S. Appl. No. 17/445,894.

*Primary Examiner* — Nicholas T Corbo
(74) *Attorney, Agent, or Firm* — BakerHostetler

(57) ABSTRACT

Systems and methods for managing the storage of content are described. A video stream may include a content identifier and content information relating to a boundary that may be used to facilitate recording of at least a portion of the video stream.

20 Claims, 6 Drawing Sheets

| Syntax | Bits | Mnemonic |
|---|---|---|
| segmentation_descriptor() { | | |
|     splice_descriptor_tag | 8 | uimsbf |
|     descriptor_length | 8 | uimsbf |
|     identifier | 32 | uimsbf |
|     segmentation_event_id | 32 | uimsbf |
|     segmentation_event_cancel_indicator | 1 | bslbf |
|     reserved | 7 | bslbf |
|     if(segmentation_event_cancel_indicator == '0') { | | |
|         program_segmentation_flag | 1 | bslbf |
|         segmentation_duration_flag | 1 | bslbf |
|         delivery_not_restricted_flag | 1 | bslbf |
|         if(delivery_not_restricted_flag == '0') { | | |
|             web_delivery_allowed_flag | 1 | bslbf |
|             no_regional_blackout_flag | 1 | bslbf |
|             archive_allowed_flag | 1 | bslbf |
|             device_restrictions | 2 | bslbf |
|         } else { | | |
|             reserved | 5 | bslbf |
|         } | | |
|         if(program_segmentation_flag == '0') { | | |
|             component_count | 8 | uimsbf |
|             for(i=0;i<component_count;i++) { | | |
|                 component_tag | 8 | uimsbf |
|                 reserved | 7 | bslbf |
|                 pts_offset | 33 | uimsbf |
|             } | | |
|         } | | |
|         if(segmentation_duration_flag == '1') | | |
|             segmentation_duration | 40 | uimsbf |
|         segmentation_upid_type | 8 | uimsbf |
|         segmentation_upid_length | 8 | uimsbf |
|         segmentation_upid() | | |
|         segmentation_type_id | 8 | uimsbf |
|         segment_num | 8 | uimsbf |
|         segments_expected | 8 | uimsbf |
|     } | | |
| } | | |

FIG. 2

CONTENT BOUNDARY BASED RECORDINGS

CROSS REFERENCE TO RELATED APPLICATIONS

This application is a continuation of U.S. patent application Ser. No. 17/445,894, filed Aug. 25, 2021, now U.S. Pat. No. 11,412,273, issued on Aug. 9, 2022, which is a continuation of U.S. patent application Ser. No. 15/282,038, filed Sep. 30, 2016, now U.S. Pat. No. 11,134,278, issued Sep. 28, 2021, which are hereby incorporated by reference in their entireties.

BACKGROUND

Content recording systems and devices, such as digital video recorders (DVRs), may facilitate the recording of various content assets. For example, a standard in-home DVR may record content locally. As another example, a cloud or network DVR service may allow an at-home user to request that a particular content asset be recorded. Instead of, or in addition to, the content being recorded on a device in the user's home, as with the standard DVR configuration, the cloud or network DVR service records and stores a copy of the requested content asset on the service provider's servers for the requesting user. When the user wishes to view the content asset, the cloud or network DVR service then delivers the copy of the recorded content to the user's cable box, mobile device, web browser, or the like for playback. Users implementing a record feature via a DVR may select a default recording schedule for the content. However, content that starts earlier or ends later than a scheduled display time (e.g., air time, program time, etc.) may result in the recording capturing only a portion of the intended content.

SUMMARY

Methods and systems for managing recorded content are described. Content boundary information may be included in a linear video stream to facilitate the alignment of downstream processes based on actual content (e.g., program, asset, etc.) start and end time. Content providers such as content creators, distributors, delivery services, and the like may insert content boundary information in a video stream. As an example, insertion of content boundary information may take the form of a SCTE-35 time signal mechanism comprising segmentation descriptors representing content boundaries and/or breaks in the content (e.g., programming). Other mechanisms may be used. The video stream (e.g., SCTE 35 stream) may also comprise a unique content identifier representing the underlying content. As such, a recipient device or downstream device, such as a linear transcoder, may receive the video stream and may condition the video stream based at least on the content identifier and the content boundary information to fragment the stream as necessary to align with one or more boundary points in the video stream. In turn, the linear packager may generate a manifest comprising at least the content identifier, the content boundary information, and information relating to the fragments that align with the content boundaries.

BRIEF DESCRIPTION OF DRAWINGS

The following detailed description is better understood when read in conjunction with the appended drawings. For the purposes of illustration, examples are shown in the drawings; however, the subject matter is not limited to the specific elements and instrumentalities disclosed. In the drawings:

FIG. 2 shows a table of an example of data fields in accordance with aspects of the disclosure;

DETAILED DESCRIPTION

Methods and systems are described for managing recorded content in a system, such as a digital video recorder (DVR) or network digital video recorder (NDVR) system. Content boundary information may be included in a linear video stream to facilitate the alignment of downstream processes based on actual content (e.g., program, asset, item, etc.) start and end time, for example.

Figure 1:
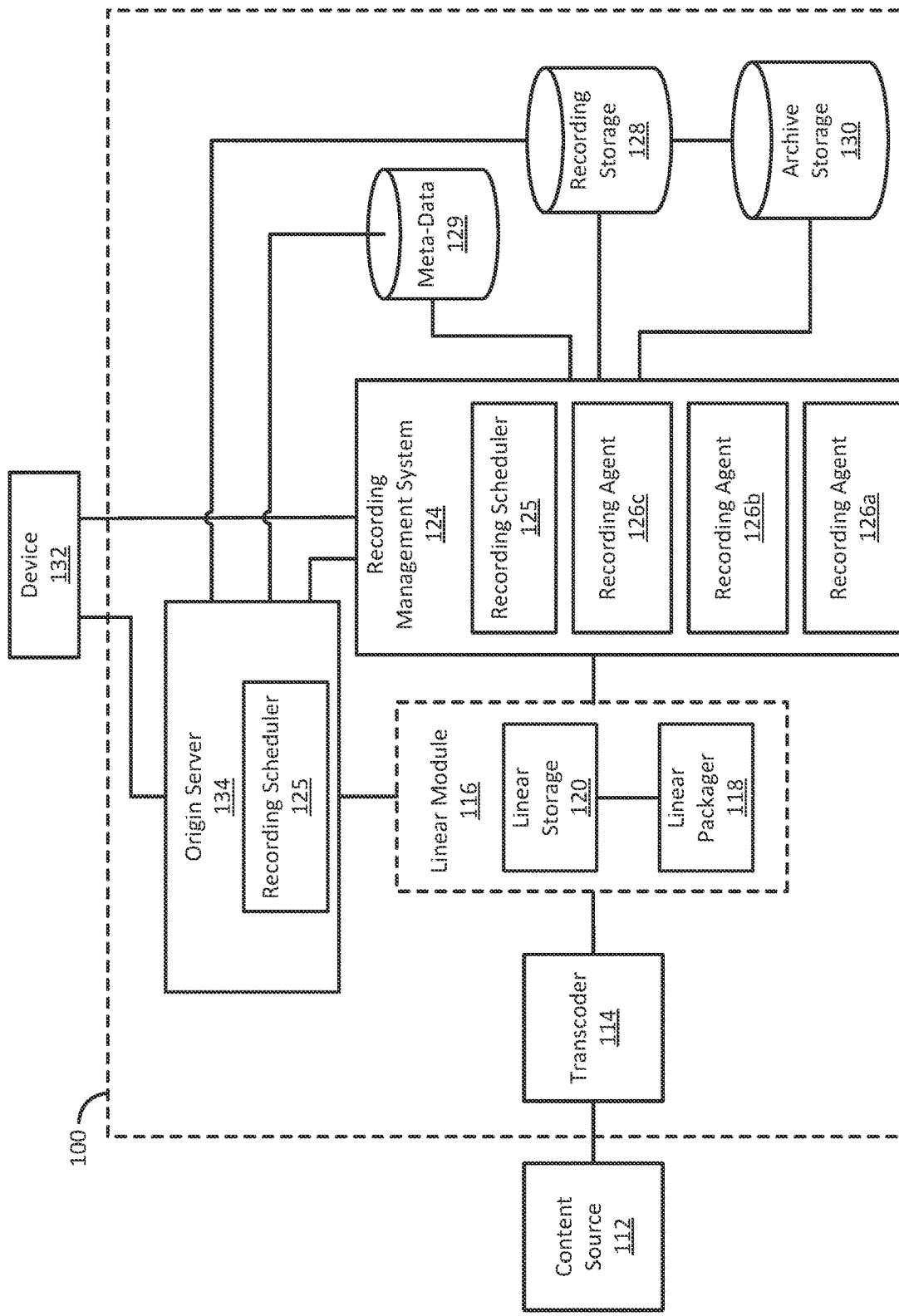
FIG. 1 shows a block diagram of an example of a system in accordance with aspects of the disclosure.

FIG. 1 shows an exemplary system 100, such as a cloud or network DVR system, by which a service provider, such as a cable television service provider, may receive a request to record content, store the requested content, and potentially fulfill a request to deliver the requested content for playback. Other systems such as local DVR system may implement the aspects of the present disclosure. Content may comprise a content asset or program, such as linear content, and may further comprise sequential content such as, for example, a television show, a movie, a sports event broadcast, or the like. As used herein, content may additionally include a portion of a program or content asset.

The request to record content may be received from a device 132 and the requested content may be delivered to the device 132 for playback. As used herein, the device 132 may refer to a hardware element, such as a set-top cable box, a streaming-video player, or a quadrature amplitude modulation (QAM) client, or a software element, such as a web browser or other software adapted to playback video. It will be appreciated that the device 132 used to request that the content be recorded in the system 100 may be distinct from the device 132 used to receive the recorded content for playback. To illustrate, a user may use his or her local device (e.g., set-top cable box or other computing device) to request that a particular content be recorded in the system 100, but may later request and playback the content with software running on his or her smart phone. The device 132 may be connected to the system 100 via any suitable network, which may comprise, for example, a cable network, satellite network, and/or the Internet.

The system 100 may include a transcoder 114. The transcoder 114 may receive content from a content source 112. The content may be in any one of a variety of formats, such as, for example, H.264, MPEG-4 Part 2, or MPEG-2. The content may be transmitted using one or more standards such as SCTE 35 or other specifications. The transcoder 114 may convert the content from one video format to another video format, such as one amenable to the means by which the service provider's users view the content. The transcoder 114 may additionally segment the content into a plurality of segments. For example, content may be segmented into a series of 2-second segments, 10-second segments, or other fixed or variable time segments.

Digital audio/video compression may be used, such as MPEG, or any other type of compression. Although reference may be made to example standards (e.g., MPEG) and formats, one of skill in the art will recognize that the systems and methods described herein are applicable to ant format or standard that support audio and/or video. As an example, the Moving Pictures Experts Group (MPEG) was established by the international Standards Organization (ISO) for the purpose of creating standards for digital audio/video compression. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. The present methods and systems may employ transmission of MPEG packets. However, the present methods and systems are not so limited, and may be implemented using other types of transmission and data.

The output of a single MPEG audio and/or video coder may be referred to as a transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts ensure that every packet that is needed to decode a stream is received. A synchronization system may be used so that decoders may correctly identify the beginning of each packet and deserialize the bit stream into words.

A content asset, such as a program, may be a group of one or more PIDs that are related to each other. For instance, a multi program transport stream used in digital television might contain three programs, to represent three television channels. In some example, each channel may include one video stream, one or two audio streams, and any necessary metadata. A receiver wishing to tune to a particular "channel" merely has to decode the payload of the PIDs associated with its program. The receiver may discard the contents of all other PIDs.

The multi program transport stream may carry many different programs and each may use a different compression factor and a bit rate that may change dynamically even though the overall bit rate stays constant. This behavior is called statistical multiplexing and it allows a program that is handling difficult material to borrow bandwidth from a program handling easy material. Each video PES may have a different number of audio and data PESs associated with it. Despite this flexibility, a decoder must be able to change from one program to the next and correctly select the appropriate audio and data channels. Some of the programs may be protected so that they may only be viewed by those who have paid a subscription or fee. The transport stream may comprise Conditional Access (CA) information to administer this protection. The transport stream may comprise Program Specific Information (PSI) to handle these tasks.

To enable the splicing of compressed bit streams, certain specifications and/or standards such as SCTE 35 may define a splice event that indicates the opportunity to splice one or more elementary streams within a content asset (e.g., program). Each splice event may be uniquely identified with identifiers such as splice_event_id. Splice events may be communicated in various manners including, but not limited to: 1) scheduled ahead of time; 2) preroll warning may be given; or 3) a command may be given to execute the splice event at specified splice points. Data fields such as a command type field (e.g., splice_command_typefield) may be used to specify the type of message being sent. Depending on the value of this field, different constraints apply to the remaining syntax. For example, the following command types may be used with SCTE 35 based systems: splice_null( ) splice_schedule( ) splice_insert( ), time_signal( ) and bandwidth reservation( ).

In particular, a time signal mechanism such as the time_signal( ) in SCTE 35 may be used to provide a time synchronized data delivery mechanism. The syntax of the time signal mechanism (e.g., time_signal( ) allows for the synchronization of the information carried in this message with the System Time Clock (STC). The unique payload of the message is carried in the descriptor, however the syntax and transport capabilities may be afforded to message. Example syntax may include descriptor syntax such as a splice descriptor syntax.

As illustrated in FIG. 2, segmentation descriptor syntax (e.g., SCTE 35 or other standard or convention) may be used as an implementation of messaging syntax. Using SCTE 35 (2014), for example, the segmentation_descriptor( )200 may be or comprise an implementation of a splice_descriptor( ) to provide an optional extension to the time_signal( ) and splice_insert( ) commands that allows for segmentation messages to be sent in a time/video accurate method. The various syntax, fields, and values of the same may be used to effect communication of information between devices and/or systems relating to the accurate recording of content such as programs. A such, content providers such as content creators, distributors, delivery services, and the like may insert content boundary information in a video stream using a SCTE-35 time signal mechanism comprising segmentation descriptors representing content boundaries and/or breaks in programming.

In an aspect, a segmentation_upid( )202 or similar context may be used to identify content or a content segment. The segmentation_upid( )202 or similar identifier may have a fixed or variable length. In a further aspect, the content segment may include a segmentation type identifier, such as segmentation_type_id 204 (SCTE 35). The segmentation type identifier (e.g., segmentation_type_id 204) may indicate a message associated with an event (e.g., boundary point) in the segment of the underlying content. For example, the segmentation type identifier may indicate a content start, content end, content breakaway, content early termination, content resumption, content run over planned, content run over unplanned, content overlap start, content blackout override, advertisement start, advertisement end, etc. Other conventions and/or standards may be used to effect similar content identification and events in a video stream and/or audio stream. As such, recording decision by recipient devices may be based on the identified content and using the events (e.g., boundary points) to determine actual content start and end times.

Returning to FIG. 1, the video stream (e.g., SCTE 35 stream) may comprise a unique content identifier representing the underlying content programing. As such, a recipient device or downstream device, such as the transcoder 114, may receive the video stream and may condition the video stream based at least on the content identifier and the content boundary information to fragment the stream as necessary to align with one or more boundary points in the video stream. In turn, a linear packager 118 may generate a manifest comprising at least the content identifier, the content boundary information, and information relating to the fragments that align with the content boundaries.

The transcoder 114 may be communicatively connected to a linear module 116, which in turn may include the linear packager 118 and a linear storage 120. The linear packager 118 and the linear storage 120 may be communicatively connected. It will be appreciated that the linear module 116 may refer generally to one or more interconnected servers, storage devices, logical elements, and the like.

The linear packager 118 may receive the content from the transcoder 114 or the recording management system 124 (discussed further herein). The linear packager 118 may determine how the content is to be segmented and put together for delivery to and eventual playback by the device 132. As part of this process, the linear packager 118 may segment the content (such as in the event that the content has not yet been segmented) or may re-segment the content (such as in the event that the content had been previously segmented). The linear packager 118 may additionally insert one or more cues or markers into the content segments at which one or more additional segments, such as segments comprising an advertisement, may be inserted by an upstream client, server, or logical module, such as the device 132 or the origin server 134.

The linear packager 118 may create a manifest file associated with the content. Generally, a manifest file may contain information describing various aspects of the associated content that may be useful for the device 132 to playback the content and/or for the recording management system 124 to store and retrieve the content. The manifest file may comprise at least the content identifier, the content boundary information, and information relating to the fragments that align with the content boundaries. The manifest file may indicate the segments comprising the content, the length of each segment, the number of segments, and/or the proper ordering of the segments necessary to effectuate a playback of the content. A manifest file may further include a network location (e.g., a hyper-text transfer protocol (HTTP) uniform resource locater (URL) link or other universal resource identifier (URI)) for each segment from which the segment may be downloaded, accessed, or retrieved. For example, the network location may indicate a location on the linear storage 120 or recording storage 128. It will be appreciated that the network locations included within a manifest file may point to more than one different location or source.

The network location for segments corresponding to the content may reference a location on the linear storage 120 while the network location for segments corresponding to an inserted advertisement may reference a location from outside the system 100. In some instances, a manifest file may describe multiple versions (e.g., different quality levels) of the content, including corresponding information on those segments. A manifest file may be provided, such as by the origin server 134, to the device 132 in response to a request to receive content recorded within the system 100. The device 132 may use the manifest file to determine the segments required to play the content or a portion of the content and subsequently download the required segments using the network locations specified in the manifest file.

The content or portions thereof may be stored in the linear storage 120, which may be accessed by the device 132 directly or indirectly via the origin server 134 to deliver the content to the device 132. The storage of the content or portions thereof may occur, in an aspect, after the linear packager 118 processes the content. The linear storage 120 may include one or more data storage devices, such as volatile memory (e.g., random access memory (RAM)), a hard disk drive, a network-attached storage (NAS), and/or a storage area network (SAN) upon which the content or portions thereof may be stored.

A recording management system 124 may be communicatively connected to the linear module 116 and one or more devices 132. The recording management system 124 may receive one or more requests from devices 132 to record content. The request to record content may include, for example, identifications of the user (e.g., an account identifier, a username, and/or a password), the device 132, the content, the station, the stream, the start time of the content, and/or the end time of the content. Upon receiving a request to record content, the recording management system 124 may access the segmented content from the linear module 116 (e.g., the linear packager 118 and/or the linear storage 120) and prepare to store a recording of the content in a communicatively connected recording storage 128. The recording storage 128 may include one or more storage devices, such as a hard disk drive, a network-attached storage (NAS), and/or a storage area network (SAN).

The recording management system 124 may include a recording scheduler 125. The recording scheduler 125 may be configured to manage the requests to record that are received via the recording management system 124 or other component. The recording scheduler 125 or a component configured with similar operable capabilities may be stand-alone or may reside outside of the recording management system 124, such as with the origin server 134. The recording scheduler 125 may be configured to manage the transmission (e.g., assignment) of recording request to one or more recording agents 126*a-c*. Certain requests may be for an entire content asset (e.g., program) and may be marked appropriately as an entirety type recording, such as using the syntax "RECORD_ENTIRETY" with a unique programming ID relating to the desired content for recording. Other syntax and requests may be processed via the recording scheduler 125 to effect recording of content.

The recording management system 124 may include a plurality of the recording agents 126*a-c*, which may each represent a pool of resources available to independently perform a recording task, such as writing copies of a segment to the recording storage 128. The recording management system 124 may track and maintain the status of each of the recording agents 126a-c. For example, the recording management system 124 may, at any given time, know which recording agents 126a-c are busy performing a recording task and which are available to be assigned a recording task to perform. As each of the recording agents 126a-c completes a recording task, the recording agent 126a-c may indicate to the recording management system 124 that the recording agent 126a-c is now available. In another aspect, each of the recording agents 126a-c may maintain each recording agents' 126a-c respective state (e.g., busy, available, etc.) instead of the recording management system 124 maintaining the state of each of the recording agents 126a-c. In such an aspect, a queue of available recording agents 126a-c may be maintained, such as by the recording management system 124. When one of the recording agents 126a-c, such as recording agent 126a, becomes available, the recording agent 126a may insert itself into the queue. When the recording management system 124 has a task to be performed, the recording management system 124 may query the queue for the next available recording agent 126a-c and assign the task to that recording agent 126a-c.

The recording management system 124 may access, such as from the linear storage 120, a segment of content that has been requested to be recorded. Based on this single access of the segment, the recording management system 124 may direct one of the available recording agents 126a-c, such as recording agent 126a, to write a copy of this segment to the recording storage 128 for each request for the content to be recorded. As an example, the recording agent 126a may provide an instruction, such as over a network socket, to the recording storage 128, wherein the instruction specifies the file of the segment and the number of times that the file is to be copied to the recording storage 128. The instruction may include an HTTP command, such as PUT, POST, or PATCH. In this manner, the segment is written multiple times to storage, but is accessed (i.e., read) only a single time. Thus, this may result in a performance increase of the recording management system 124 and the system 100 as a whole because the read operation of the segment from the linear storage 120 need only occur a single time for all the segment copies instead of once for each segment copy. When the recording agent 126a finishes writing the copies of the segment to the recording storage 128, the recording agent 126a may indicate to the recording management system 124 that the recording agent 126a has successfully written the copies of the segment and that the recording agent 126a is available to perform another recording task. In the event that the recording agent 126a is unsuccessful in its task (e.g., the recording storage 128 indicates a disk error), the recording agent 126a may indicate so to the recording management system 124 and the recording management system 124 may direct the recording agent 126a to attempt to repeat the recording task or assign the recording task to another of the recording agents 126a-c, such as recording agent 126b. This process may be repeated until all of the segments of the content are copied to the recording storage 128 and there is a complete copy of the content in the recording storage 128 for each user request to record the content.

The recording agents 126a-c may be configured to monitor the schedule of recordings (e.g., via the recording scheduler 125) and may determine any changes with manifest via the linear packager 118. The recording agents 126a-c may be configured to update scheduling information in a meta-data database 129. The meta-data database 129 may be configured to store various forms of information including, but not limited to, scheduling information, recording and video playback data, and device, user, and/or content identifiers.

In operation, the recording management system 124 may receive one or more linear video streams or fragments thereof. As the recording management system 124 receives request to record certain content, for example, based on a unique content identifier, the recording management system 124 may cause particular portions of the linear video stream to be recorded. For example, a user may request that content having a content identifier of "Program One" to be recording in its entirety. As such, the recording management system 124 may process the request and may schedule the recording. However, rather than simply recording a particular channel of content, the recording management system 124 may begin recording when a particular syntax or event code is detected in the linear video stream or fragments thereof. As a further example, the linear video stream may comprise of an SCTE-35 TimeSignal w/SegmentationDescriptor containing a segmentationTypeID of "Content Start" and the unique content identifier of "Program One" in the segmentationUpid field. As such, the unique content identifier is matched with the request to record and the recording will begin based on the fragment containing the marker that identifiers the "Content Start." In this way, even if the content is delayed or is not aired on schedule, the recording management system 124 will cause the content to be recorded based on the boundary point information included in the video stream.

It is possible for content programming to break and resume at a later time. For example, extreme weather conditions in sporting events may cause breaks in programming. In this case, the linear video stream may comprise a message (e.g., syntax) with marking that a break in programming is received (e.g., a SCTE 35 TimeSignal w/SegmentationDescriptor containing a "Content Breakaway" for the unique content identifier). As such, recordings may be paused and then started again once the break has ended and a message (e.g., SCTE-35 syntax) is received indicating that the continuation of the original programming (e.g., SCTE 35 TimeSignal w/SegmentationDescriptor containing a "Content Resumption" for the unique content identifier).

Additional operations may be controlled using embedded syntax in the linear video stream, such as using SCTE-35 syntax. For example, a recording may be stopped for a request type "RECORD_ENTIRETY" when the unique programming associated with the scheduled recording changes on the linear stream. Such as change may occur when a new SCTE-35 embedded signal is received that marks the end of content boundary point for this unique content identifier. Other syntax may be used to indicate the end boundary point of a particular content associated with the unique content identifier.

An archive storage 130 may be communicatively connected to the recording management system 124 and/or the recording storage 128, and may include one or more storage devices, such as a hard disk drive, a network-attached storage (NAS), and/or a storage area network (SAN). The archive storage 130 may archive copies of content that have spent a certain amount of time in the recording storage 128. That is, once a certain amount of time passes since content has been recorded and copies made in the recording storage 128, the copies in the recording storage 128 may be deleted and a single copy may be made in the archive storage 130.

If the archived content is requested by a user to be delivered to the device 132 of the user for playback, the recording management system 124 may access the copy of the content in the archive storage 130 and make a new copy of the content in the recording storage 128. The copy of the content in the recording storage 128 may then be delivered to the device 132 of the user, either directly or via the origin server 134, which may be communicatively connected to the recording storage 128 directly or via the recording management system 124.

In an aspect, the segmented nature of the content may be leveraged to begin delivering the content from the recording storage 128 to the device 132 before the content is completely copied over from the archive storage 130. In this instance, when a user requests delivery of content archived in the archive storage 130, the recording management system 124 may begin by copying the first segment of the content to the recording storage 128. The origin server 134 need not wait until all of the segments of the content are copied to the recording storage 128 before beginning to deliver the content to the device 132, but may instead begin delivering the segments of the content when the first segment (or otherwise sufficient beginning subset of the segments) is copied to the recording storage 128. The recording management system 124 may then continue copying subsequent segments (e.g., the second segment, the third segment, and so forth) of the content to the recording storage 128, which may then be delivered to the device 132. Preferably, the subsequent segments may be copied from the recording storage 128 to the archive storage 130 and delivered to the device 132 at a rate sufficient for the playback of the segments on the device 132 to be seamlessly maintained. If the playback on the device 132 is stopped or paused and no additional segments of the content are requested, a full duplicate copy may still be created. Thus in this instance, the recording management system 124 may determine the segments of the content that do not need to be delivered to the device 132 (e.g., segments preceding a mid-program playback start point, segments that are skipped during playback, such as those for a commercial, and segments subsequent to a playback stop point) and have not yet been copied to the recording storage 128. Those segments may then be copied from the archive storage 130 to the recording storage 128 to reconstitute the entire unique copy of the content.

The origin server 134 may receive and fulfill a request from the device 132 of a user to deliver a recorded content to the device 132 for playback. The request from the device 132 to deliver the recorded content may include identifications of the user (e.g., an account identifier, a username and/or a password), the device 132, the requested content, and/or a playback time point or temporal location (e.g., the start of a asset or the 12:30 mark in a 30:00 asset). In certain aspects, the request to deliver the content may reflect a user skipping to a particular portion of content of which the initial segments of the content have already been delivered and are being played on the device 132. For example, a user may have started viewing the first minute of a content asset and then decided to skip to a midway point of the content asset. In this case, the request to deliver the content asset would indicate that the device 132 required the segments of the content asset from that midway point and after. Upon receiving a request to deliver a recorded content to the device 132, the origin server 134 may provide one or more manifest files (discussed further herein) to the device 132 that describe the content and segments thereof, including network locations from which each segment may be downloaded. Using the manifest file, the device 132 may iteratively download the segments comprising the content. As the device 132 downloads sufficient segments of the content, the device 132 may begin playback of the content.

Figure 3:
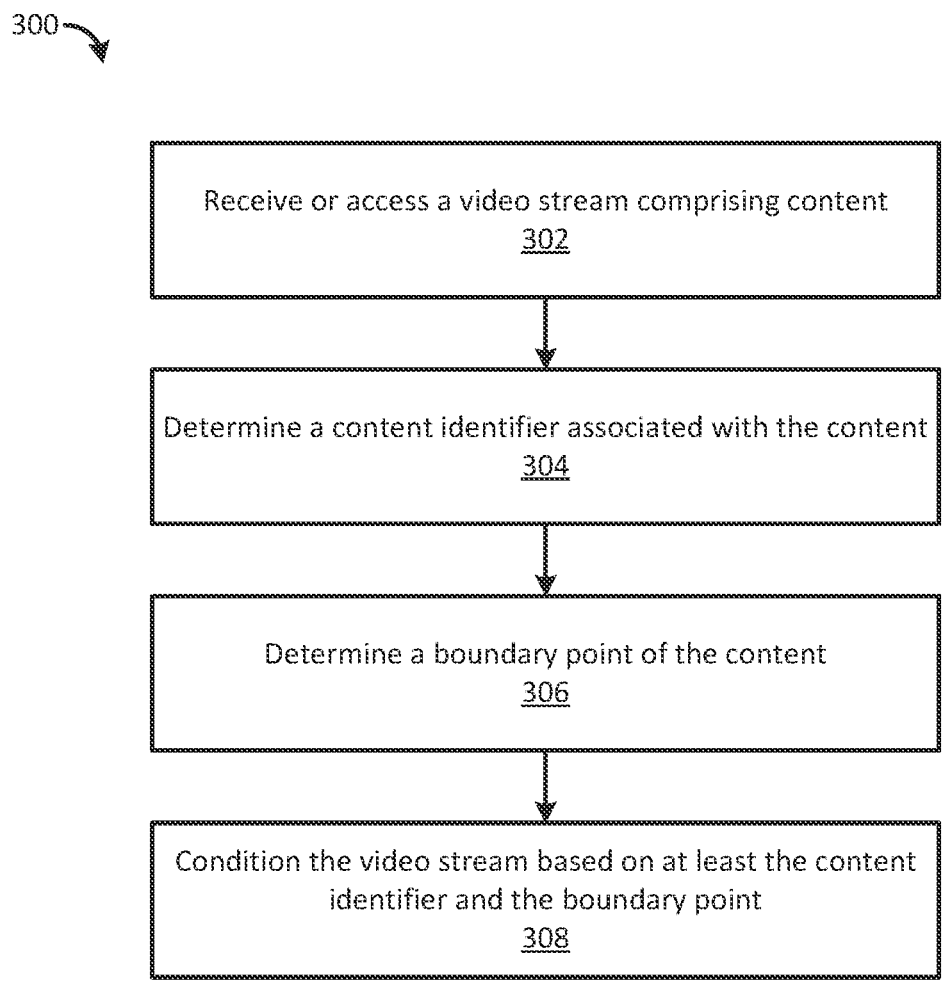
FIG. 3 shows a flow chart of an exemplary method in accordance with aspects of the disclosure.

FIG. 3 shows an example flow chart for a method 300. At step 302, a video (e.g., video stream) such as a linear video stream may be received or accessed. The video may comprise a content asset and content information. The video may be or comprise a MPEG transport stream. The video may comprise of a time signal mechanism in accordance with SCTE 35 and at least a portion of the content information is associated with the time signal mechanism. The video may comprise a segmentation descriptor mechanism in accordance with SCTE 35 and at least a portion of the content information is associated with the segmentation descriptor mechanism.

At step 304, a content identifier may be determined. The content identifier may be a unique identifier associated with the content. The content identifier may relate to the content and may be determined based on at least the content information. As an example, the content identifier may be embedded in the video (e.g., linear video stream), for example, using a data field such as "segmentationUpid" or other syntax receiving field. As such a device receiving the video may extract the information in a specific data field or in general metadata or headers in order to determine the content identifier.

At step 306, a boundary point of the content may be determined. As an example, the boundary point may be determined based on at least the content information. The boundary point may be or comprise a start point, an end point, a break point, or the like. As an example, the content information may embedded in the video as a SCTE-35 TimeSignal w/SegmentationDescriptor containing a segmentationTypeID that indicates a boundary (e.g., Content Start).

At step 308, the video (e.g., linear video stream) may be conditioned based on at least the content identifier and the boundary point. Conditioning the video may comprise fragmenting the video and generating a manifest relating to the fragmented video, wherein the manifest comprises at least a portion of the content information.

The conditioning the video may facilitate the recording of the content based on at least the determined content identifier and the determined boundary point independent of a scheduled time of delivery of the content. For example, the content may be delivered to a recipient device based on a predefined schedule, such as a programming schedule associated with one or more programming channels. However, the actual transmittal of the content for display at the recipient device may be off the pre-defined schedule due to various reasons such as content over-run or delay. As such, a recording based on the predefined schedule may capture an unintended portion of content. Since, the content of the present disclosure is conditioned based on an actual boundary of the content, the recipient device may schedule a recording based on at least the content identifier and the determined content boundary. Accordingly, the recording may capture the start and end of the content (e.g., content asset) with accuracy regardless of the predetermined schedule of transmittal and/or any delays or extensions of programming.

Figure 4:
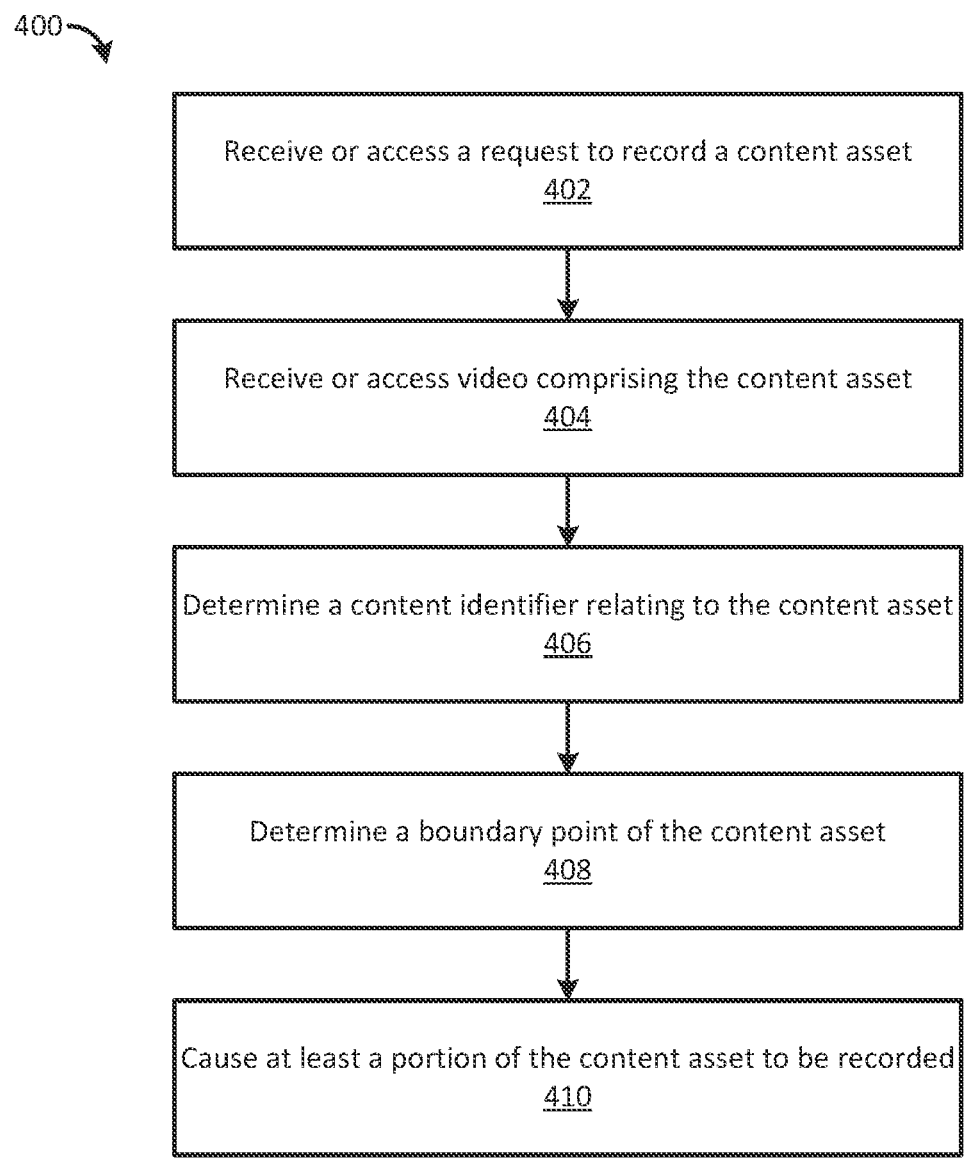
FIG. 4 shows a flow chart of an exemplary method in accordance with aspects of the disclosure.

FIG. 4 shows an example flow chart for a method 400. At step 402, a request to record content may be received or accessed. As an example, and with reference to FIG. 1, the recording management system 124 may receive one or more requests from devices 132 to record content. The request to record content may include, for example, identifications of the user (e.g., an account identifier, a username, and/or a password), the device 132, the content, the station, the stream, the start time of the content, and/or the end time of the content. Upon receiving a request to record content, the recording management system 124 may access the segmented content from the linear module 116 (e.g., the linear packager 118 and/or the linear storage 120) and prepare to store a recording of the content in a communicatively connected recording storage 128. The recording storage 128 may include one or more storage devices, such as a hard disk drive, a network-attached storage (NAS), and/or a storage area network (SAN).

At step 404, a video such as a linear video stream may be received or accessed. The linear video stream may comprise content (e.g., content assets) and content information. The linear video stream may be or comprise a MPEG transport stream. The linear video stream may comprise a time signal mechanism in accordance with SCTE 35 and at least a portion of the content information is associated with the time signal mechanism. The linear video stream may comprise a segmentation descriptor mechanism in accordance with SCTE 35 and at least a portion of the content information is associated with the segmentation descriptor mechanism.

At step 406, a content identifier may be determined. The content identifier may be a unique identifier associated with the content. The content identifier may relate to the content (e.g., content asset) and may be determined based on at least the content information. As an example, the content identifier may be embedded in the linear video stream, for example, using a data field such as "segmentationUpid" or other syntax receiving field.

At step 408, a boundary point of the content may be determined. As an example, the boundary point may be determined based on at least the content information. The boundary point may be or comprise a start point, an end point, a break point, or the like. As an example, the content information may embedded in the linear video stream as a SCTE-35 TimeSignal w/SegmentationDescriptor containing a segmentationTypeID that indicates a boundary (e.g., Content Start).

At step 410, at least a portion of the content may be caused to be recorded, for example, using the determined content identifier and the determined boundary point of the content. Causing at least a portion of the content to be recorded may comprise storing at least the portion of the content in memory. As an example, and with reference to FIG. 1, the recording management system 124 may access, such as from the linear storage 120, a segment of content that has been requested to be recorded. Based on this single access of the segment, the recording management system 124 may direct one of the available recording agents 126*a-c*, such as recording agent 126*a*, to write a copy of this segment to the recording storage 128 for each request for the content to be recorded. When the recording agent 126*a* finishes writing the copies of the segment to the recording storage 128, the recording agent 126*a* may indicate to the recording management system 124 that the recording agent 126*a* has successfully written the copies of the segment and that the recording agent 126*a* is available to perform another recording task. In the event that the recording agent 126*a* is unsuccessful in its task (e.g., the recording storage 128 indicates a disk error), the recording agent 126*a* may indicate so to the recording management system 124 and the recording management system 124 may direct the recording agent 126*a* to attempt to repeat the recording task or assign the recording task to another of the recording agents 126*a-c*, such as recording agent 126*b*. This process may be repeated until all of the segments of the content are copied to the recording storage 128 and there is a complete copy of the content in the recording storage 128 for each user request to record the content.

In certain aspects, the video stream including the content intended to be recorded may be delivered to a recipient device based on a predefined schedule, such as a programming schedule associated with one or more content channels. However, the actual transmittal of the content for display at the recipient device may be off the pre-defined schedule due to various reasons such as content over-run or delay. As such, a recording based on the predefined schedule may capture an unintended portion of content. Since, the video stream of the present disclosure is conditioned based on an actual boundary of the content, the recipient device may schedule a recording based on at least the content identifier and the determined content boundary. Accordingly, the recording may capture the start and end of the content with accuracy regardless of the predetermined schedule of transmittal and/or any delays or extensions.

Figure 5:
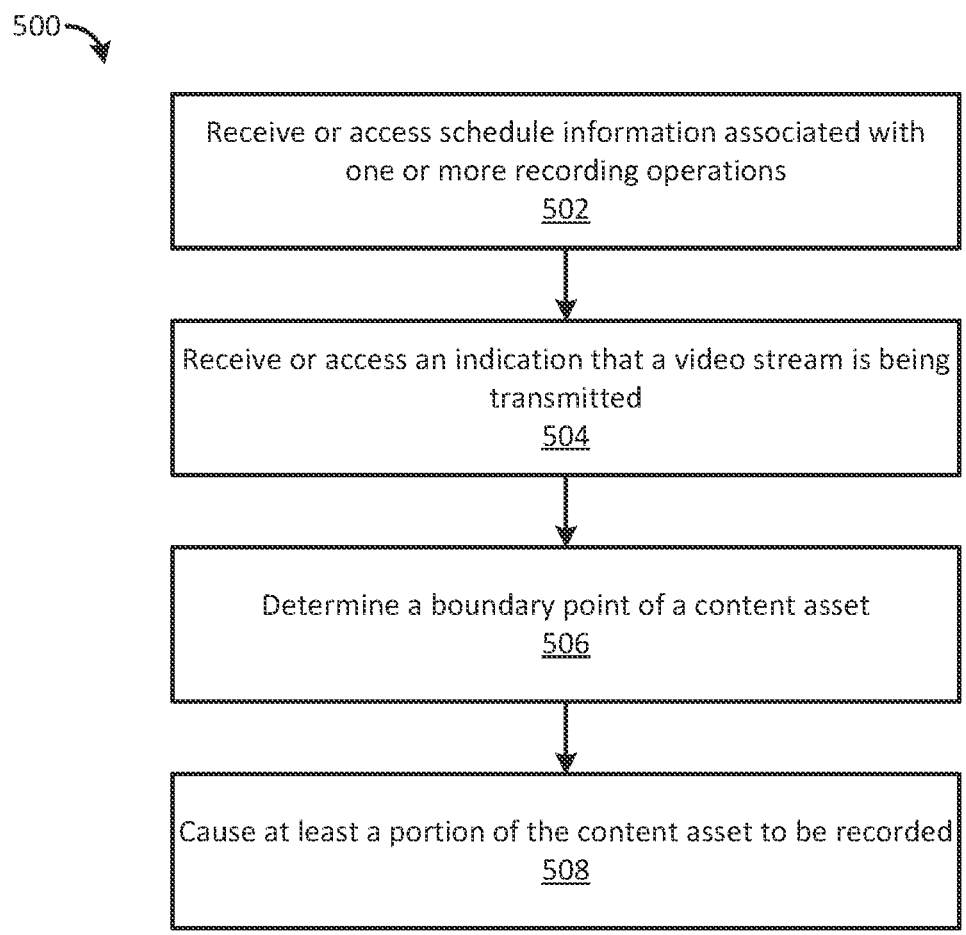
FIG. 5 shows a flow chart of an exemplary method in accordance with aspects of the disclosure.

FIG. 5 shows an example flow chart for a method 500. At step 502, information relating to one or more recording operations may be accessed or received. As an example, and with reference to FIG. 1, the recording management system 124 may receive one or more requests from devices 132 to record content. The request to record content may include, for example, identifications of the user (e.g., an account identifier, a username, and/or a password), the device 132, the content, the station, the stream, the start time of the content, and/or the end time of the content. Upon receiving a request to record content, the recording management system 124 may access the segmented content from the linear module 116 (e.g., the linear packager 118 and/or the linear storage 120) and prepare to store a recording of the content in a communicatively connected recording storage 128. The recording storage 128 may include one or more storage devices, such as a hard disk drive, a network-attached storage (NAS), and/or a storage area network (SAN).

As a further example, the recording management system 124 may include a recording scheduler 125. The recording scheduler 125 may be configured to manage the requests to record that are received via the recording management system 124 or other component. The recording scheduler 125 or a component configured with similar operable capabilities may be stand-alone or may reside outside of the recording management system 124, such as with the origin server 134. The recording scheduler 125 may be configured to manage the transmission (e.g., assignment) of recording request to one or more recording agents 126*a-c*. Certain requests may be for an entire content asset and may be marked appropriately as an entirety type recording, such as using the syntax "RECORD_ENTIRETY" with a unique content ID relating to the desired content for recording. Other syntax and requests may be processed via the recording scheduler 125 to effect recording of content.

At step 504, an indication that video (e.g., linear video stream) is being transmitted may be received or accessed. The video may comprise content and content information. The video may be or comprise a MPEG transport stream. The video may comprise a time signal mechanism in accordance with SCTE 35 and at least a portion of the content information is associated with the time signal mechanism. The video may comprise a segmentation descriptor mechanism in accordance with SCTE 35 and at least a portion of the content information is associated with the segmentation descriptor mechanism.

At step 506, a boundary point of the content may be determined. As an example, the boundary point may be determined based on at least the content information. The boundary point may be or comprise a start point, an end point, a break point, a resumption point, or the like. As an example, the content information may be embedded in the linear video stream as a SCTE-35 TimeSignal w/SegmentationDescriptor containing a segmentationTypeID that indicates a boundary (e.g., Content Start).

At step 508, at least a portion of the content may be caused to be recorded, for example, using the determined content identifier and the determined boundary point of the content. Causing at least a portion of the content to be recorded may comprise storing at least the portion of the content in memory. As an example, and with reference to FIG. 1, the recording management system 124 may access, such as from the linear storage 120, a segment of content that has been requested to be recorded. Based on this single access of the segment, the recording management system 124 may direct one of the available recording agents 126a-c, such as recording agent 126a, to write a copy of this segment to the recording storage 128 for each request for the content to be recorded. When the recording agent 126a finishes writing the copies of the segment to the recording storage 128, the recording agent 126a may indicate to the recording management system 124 that the recording agent 126a has successfully written the copies of the segment and that the recording agent 126a is available to perform another recording task. In the event that the recording agent 126a is unsuccessful in its task (e.g., the recording storage 128 indicates a disk error), the recording agent 126a may indicate so to the recording management system 124 and the recording management system 124 may direct the recording agent 126a to attempt to repeat the recording task or assign the recording task to another of the recording agents 126a-c, such as recording agent 126b. This process may be repeated until all of the segments of the content are copied to the recording storage 128 and there is a complete copy of the content in the recording storage 128 for each user request to record the content.

In certain aspects, since the video of the present disclosure is conditioned to include an identification of the content identifier and an actual boundary of the content, a recipient device may manage a recording based on at least the content identifier and the determined content boundary. Accordingly, the recording may capture the start and end of the content with accuracy regardless of the predetermined schedule of transmittal and/or any delays or extensions.

Figure 6:
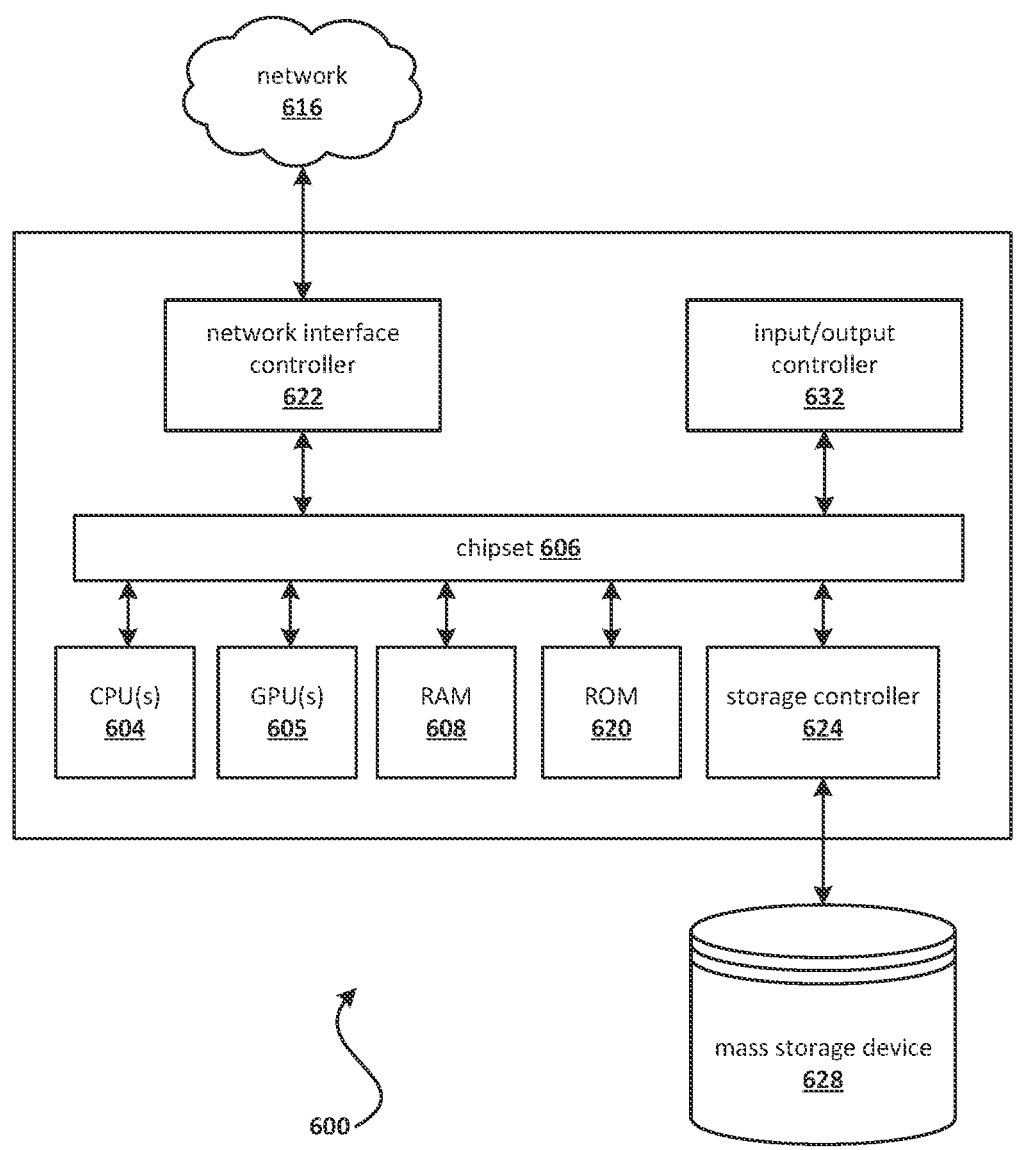
FIG. 6 shows a block diagram of an exemplary computing device.

FIG. 6 depicts a computing device that may be used in various aspects, such as the servers, modules, and/or devices depicted in FIG. 1. With regard to the example architecture of FIG. 1, the transcoder 114, the linear module 116, the linear packager 118, the linear storage 120, the recording management system 124, the recording agents 126a-c, the recording storage 128, the archive storage 130, the origin server 134, and/or the device 132 may each be implemented in an instance of a computing device 600 of FIG. 6. The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 3, 4, and 5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored.

The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described above, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described above. The computing device 600 may have access to computer-readable storage media storing computer-executable instructions, which, when executed by the computing device 600, may perform the methods described in relation to FIGS. 3-5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
   receiving, at a computing device, a request to record a content asset;

receiving video content comprising the content asset and content information;
determining, based at least on the content information, a content identifier relating to the content asset;
determining, based at least on the content information, a boundary point of the content asset;
determining a first location of a stored portion of the content asset; and
causing, based on the content identifier and the boundary point of the content asset, at least the stored portion of the content asset to be stored at a second location.

2. The method of claim 1, wherein causing the at least the stored portion of the content asset to be stored at the second location comprises writing a copy of the at least the stored portion of the content asset.

3. The method of claim 1, further comprising:
receiving an indication the at least the stored portion of the content asset is successfully stored at the second location.

4. The method of claim 1, further comprising:
receiving an indication the at least the stored portion of the content asset is failed to be stored at the second location; and
causing, based on the content identifier and the boundary point of the content asset, the at least the stored portion of the content asset to be stored at a third location.

5. The method of claim 4, wherein the indication comprises a disk error indication.

6. The method of claim 1, wherein the video stream comprises an MPEG transport stream.

7. The method of claim 1, wherein the video stream comprises a time signal mechanism in accordance with SCTE 35 and wherein at least a portion of the content information is associated with the time signal mechanism.

8. An apparatus comprising:
one or more processors; and
memory storing computer executable instructions that, when executed, cause the apparatus to:
receive a request to record a content asset;
receive video content comprising the content asset and content information;
determine, based at least on the content information, a content identifier relating to the content asset;
determine, based at least on the content information, a boundary point of the content asset;
determine a first location of a stored portion of the content asset; and
cause, based on the content identifier and the boundary point of the content asset, at least the stored portion of the content asset to be stored at a second location.

9. The apparatus of claim 8, wherein causing the at least the stored portion of the content asset to be stored at the second location comprises writing a copy of the at least the stored portion of the content asset.

10. The apparatus of claim 8, wherein the computer executable instructions, when executed, further cause the apparatus to:
receive an indication the at least the stored portion of the content asset is successfully stored at the second location.

11. The apparatus of claim 8, wherein the computer executable instructions, when executed, further cause the apparatus to:
receive an indication the at least the stored portion of the content asset is failed to be stored at the second location; and
cause, based on the content identifier and the boundary point of the content asset, the at least the stored portion of the content asset to be stored at a third location.

12. The apparatus of claim 11, wherein the indication comprises a disk error indication.

13. The apparatus of claim 8, wherein the video stream comprises an MPEG transport stream.

14. The apparatus of claim 8, wherein the video stream comprises a time signal mechanism in accordance with SCTE 35 and wherein at least a portion of the content information is associated with the time signal mechanism.

15. A non-transitory computer-readable medium storing instructions that, when executed, cause:
receiving, at a computing device, a request to record a content asset;
receiving video content comprising the content asset and content information;
determining, based at least on the content information, a content identifier relating to the content asset;
determining, based at least on the content information, a boundary point of the content asset;
determining a first location of a stored portion of the content asset; and
causing, based on the content identifier and the boundary point of the content asset, at least the stored portion of the content asset to be stored at a second location.

16. The non-transitory computer-readable medium of claim 15, wherein causing the at least the stored portion of the content asset to be stored at the second location comprises writing a copy of the at least the stored portion of the content asset.

17. The non-transitory computer-readable medium of claim 15, wherein the instructions, when executed, further cause:
receiving an indication the at least the stored portion of the content asset is successfully stored at the second location.

18. The non-transitory computer-readable medium of claim 15, wherein the instructions, when executed, further cause:
receiving an indication the at least the stored portion of the content asset is failed to be stored at the second location; and
causing, based on the content identifier and the boundary point of the content asset, the at least the stored portion of the content asset to be stored at a third location.

19. The non-transitory computer-readable medium of claim 18, wherein the indication comprises a disk error indication.

20. The non-transitory computer-readable medium of claim 15, wherein the video stream comprises an MPEG transport stream.

* * * * *